(12) United States Patent　(10) Patent No.:　US 7,048,290 B2
Paquette　(45) Date of Patent:　May 23, 2006

(54) RECUMBENT CYCLE WITH A SINGLE STROKE LINEAR PEDALING SYSTEM

(76) Inventor: Stéphane Paquette, 719, Damase Perrier, Luskville, Quebec (CA) J0X 2G0

( * ) Notice: Subject to any disclaimer, the term of this patent is extended or adjusted under 35 U.S.C. 154(b) by 0 days.

(21) Appl. No.: 10/703,133

(22) Filed: Nov. 6, 2003

(65) Prior Publication Data

US 2005/0098977 A1　May 12, 2005

(51) Int. Cl.
 *B62M 1/04*　(2006.01)
(52) U.S. Cl. .................................. 280/252; 280/288.1
(58) Field of Classification Search ................ 280/252, 280/253, 254, 255, 288.1
See application file for complete search history.

(56) References Cited

U.S. PATENT DOCUMENTS

| | | | |
|---|---|---|---|
| 3,760,905 A | 9/1973 | Dower | |
| 4,900,013 A | 2/1990 | Rodgers | |
| 5,125,677 A | 6/1992 | Ogilvie et al. | |
| 5,236,211 A | 8/1993 | Meguerditchian | |
| 5,242,181 A | 9/1993 | Fales et al. | |
| 5,280,936 A * | 1/1994 | Schmidlin | 280/234 |
| 5,690,346 A | 11/1997 | Keskitalo | |
| 5,732,963 A | 3/1998 | White | |
| 5,979,922 A | 11/1999 | Becker et al. | |
| 6,000,707 A | 12/1999 | Miller | |
| 6,007,083 A | 12/1999 | Currie | |
| 6,155,584 A | 12/2000 | Dallet | |
| 6,378,882 B1 | 4/2002 | Devine | |
| 6,609,724 B1 * | 8/2003 | Dzvonik | 280/288.1 |

* cited by examiner

*Primary Examiner*—Tony Winner

(57) ABSTRACT

A recumbent bicycle having a single stroke linear type of pedaling wherein both legs protract and retract simultaneously so that a single push is made instead of alternating pushes. Various other adjustements are posssible to accomodate the length of a user legs and the degree of extension desired.

8 Claims, 6 Drawing Sheets

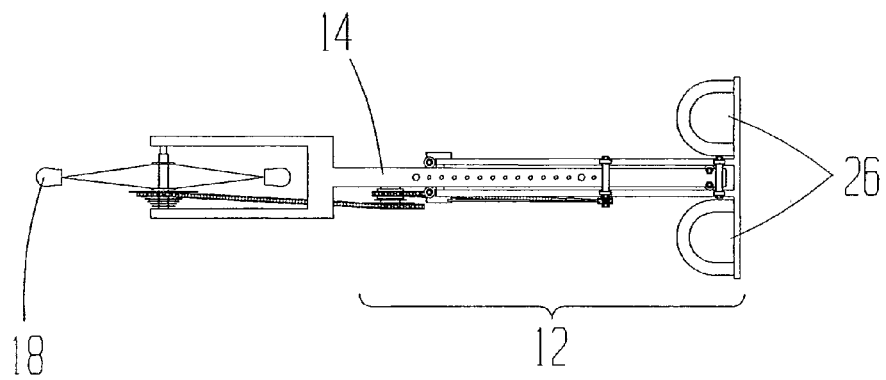
FIG. 1
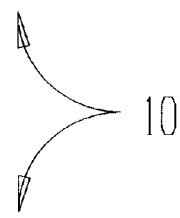
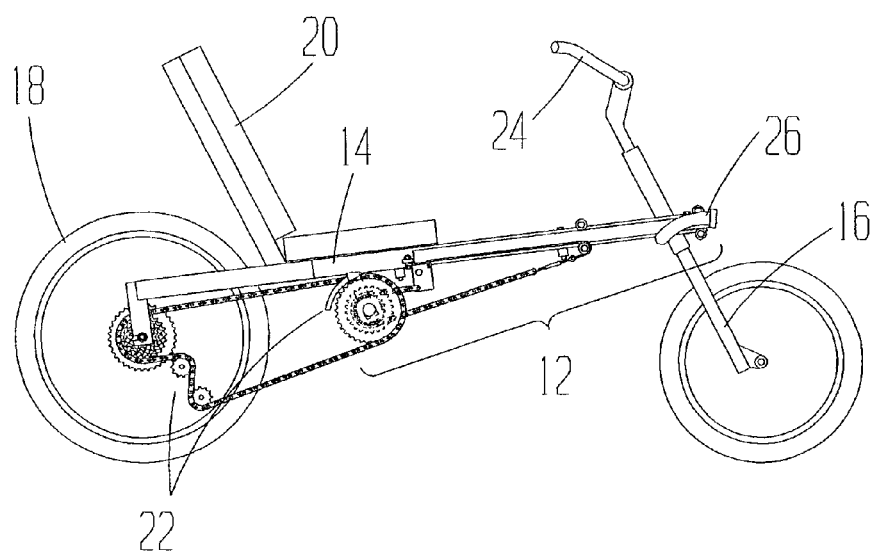
FIG. 2

RECUMBENT CYCLE WITH A SINGLE STROKE LINEAR PEDALING SYSTEM

BACKGROUND OF THE INVENTION

1. Field of the Invention

The invention relates generally to bicycles but more particularly to a recumbent bicycle using a single linear stroke pedaling system.

2. Background of the Invention

Bicycles have been around for over a century and the pedal system has not evolved much except for an increasing number of gears and the gear shifting system. Basically, it still consists in a rotational motion of the pedals in order to rotate a first gear connected to a second gear by way of a chain. Recent developments in bicycle technology have given us the recumbent bicycle which still uses, for the most part, rotational pedaling. In recent years, various guises of linear reciprocal pedaling have seen the day and they are used on both traditional frame bicycles and recumbent bicycles. This new type of reciprocal pedaling procures advantages over rotational pedaling but there is still room for improvement.

SUMMARY OF THE INVENTION

The present recumbent bicycle offers a unique single stroke linear type of pedaling wherein both legs protract and retract simultaneously so that a single push is made instead of alternating pushes. Various other adjustements are posssible to accomodate the length of a user legs and the degree of extension desired. This basic principle of a single stroke linear pedaling can also be adapted to various human powered vehicles much as a standard bicycle pedaling system can be adapted to various vehicles whether for use on land, water or even airborne. Therefore, the foregoing and other objects, features, and advantages of this invention will become more readily apparent from the following detailed description of a preferred embodiment with reference to the accompanying drawings, wherein the preferred embodiment of the invention is shown and described, by way of examples. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE PREFERRED EMBODIMENT

FIG. 1 Top view of a recumbent bicycle.

FIG. 2 Side view of a bicycle.

Figure 3A:
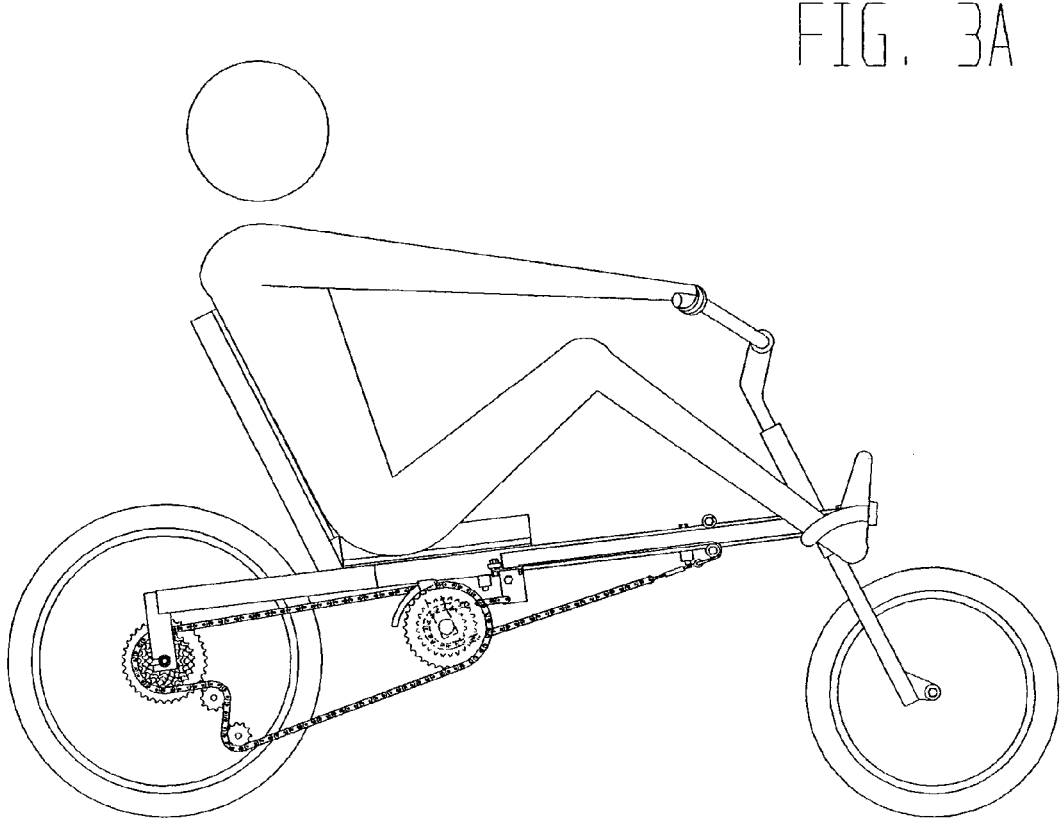
Figure 3B:
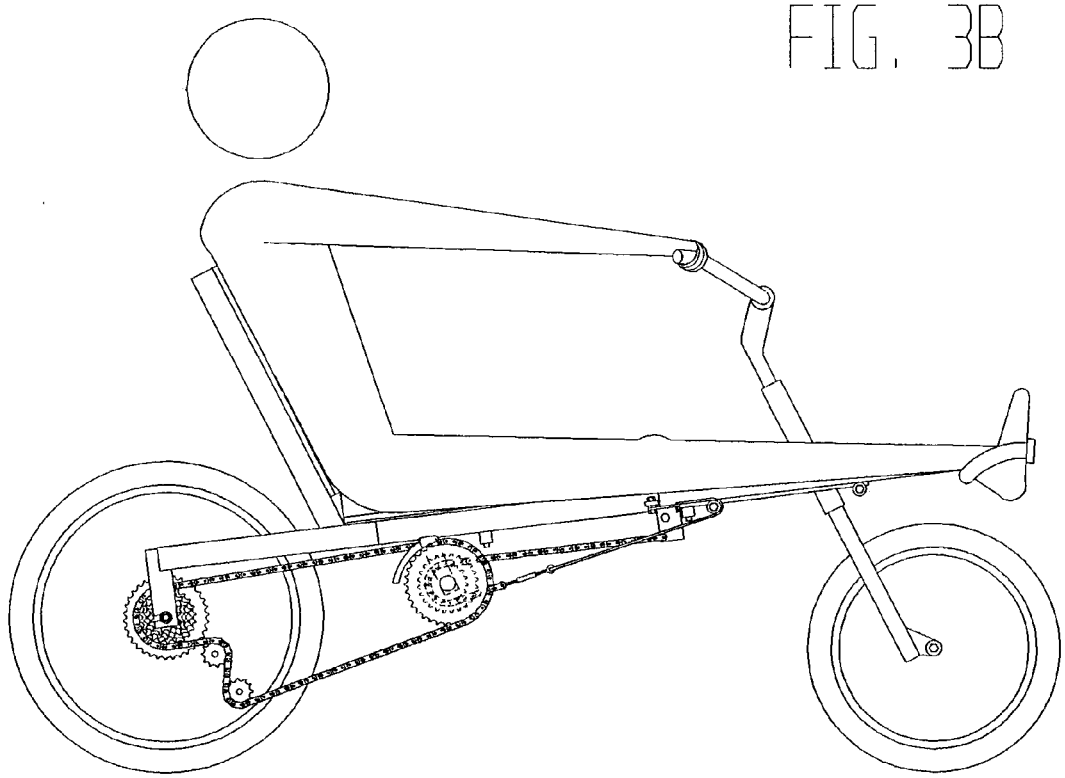

FIGS. 3ab Side views of a bicycle showing the motion of a user's legs as well as of the single stroke linear pedaling system.

Figure 4:
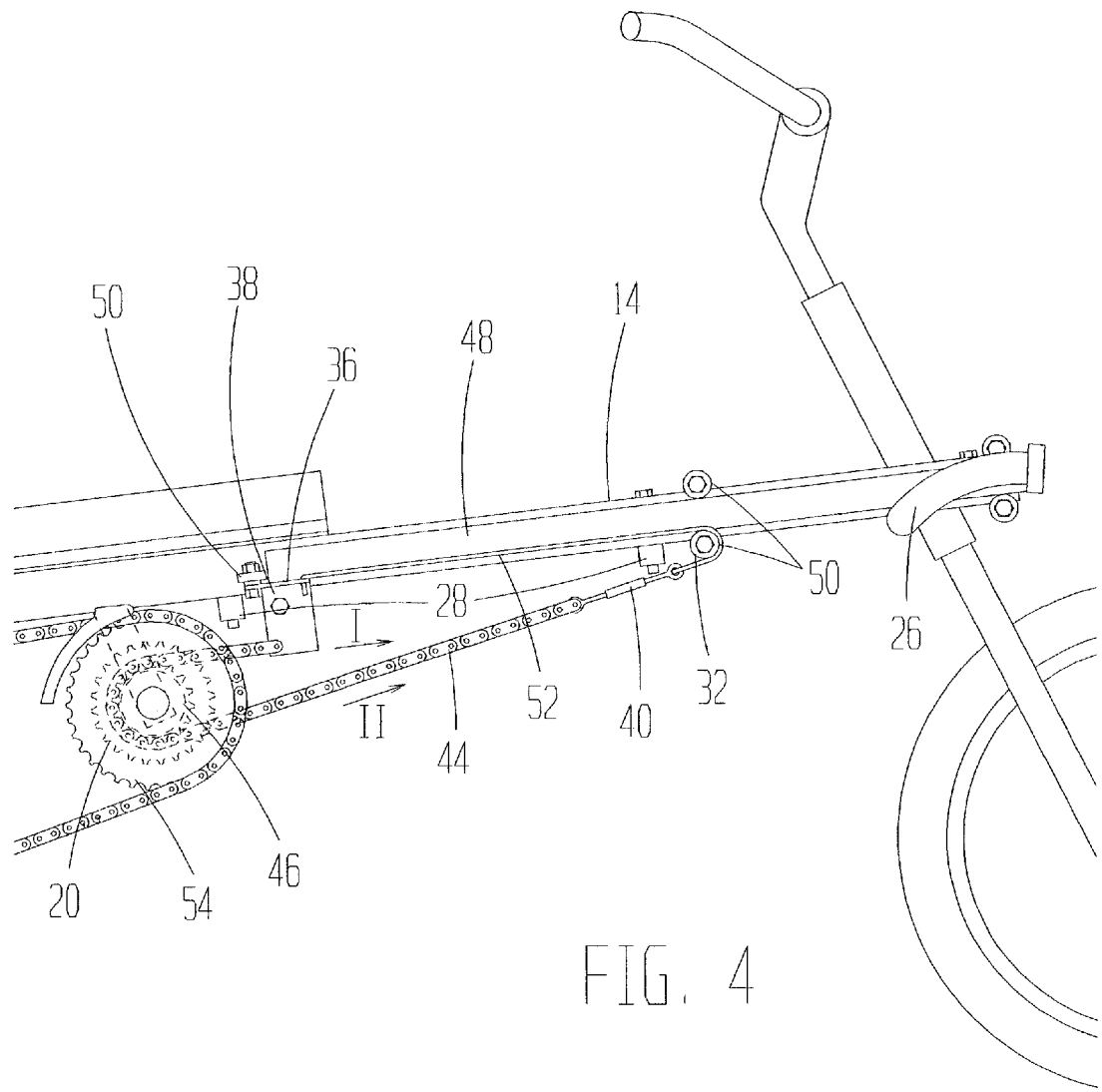

FIG. 4 Side view up close of the single stroke linear pedaling system.

Figure 5:
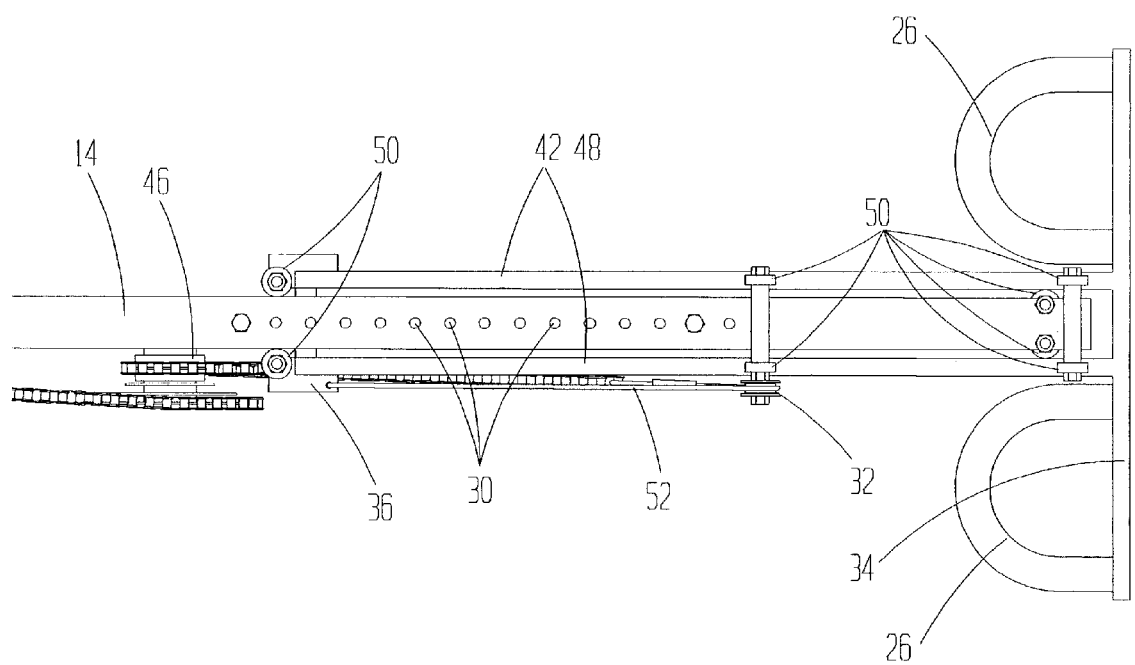

FIG. 5 Top view up close of the single stroke linear pedaling system.

Figure 6:
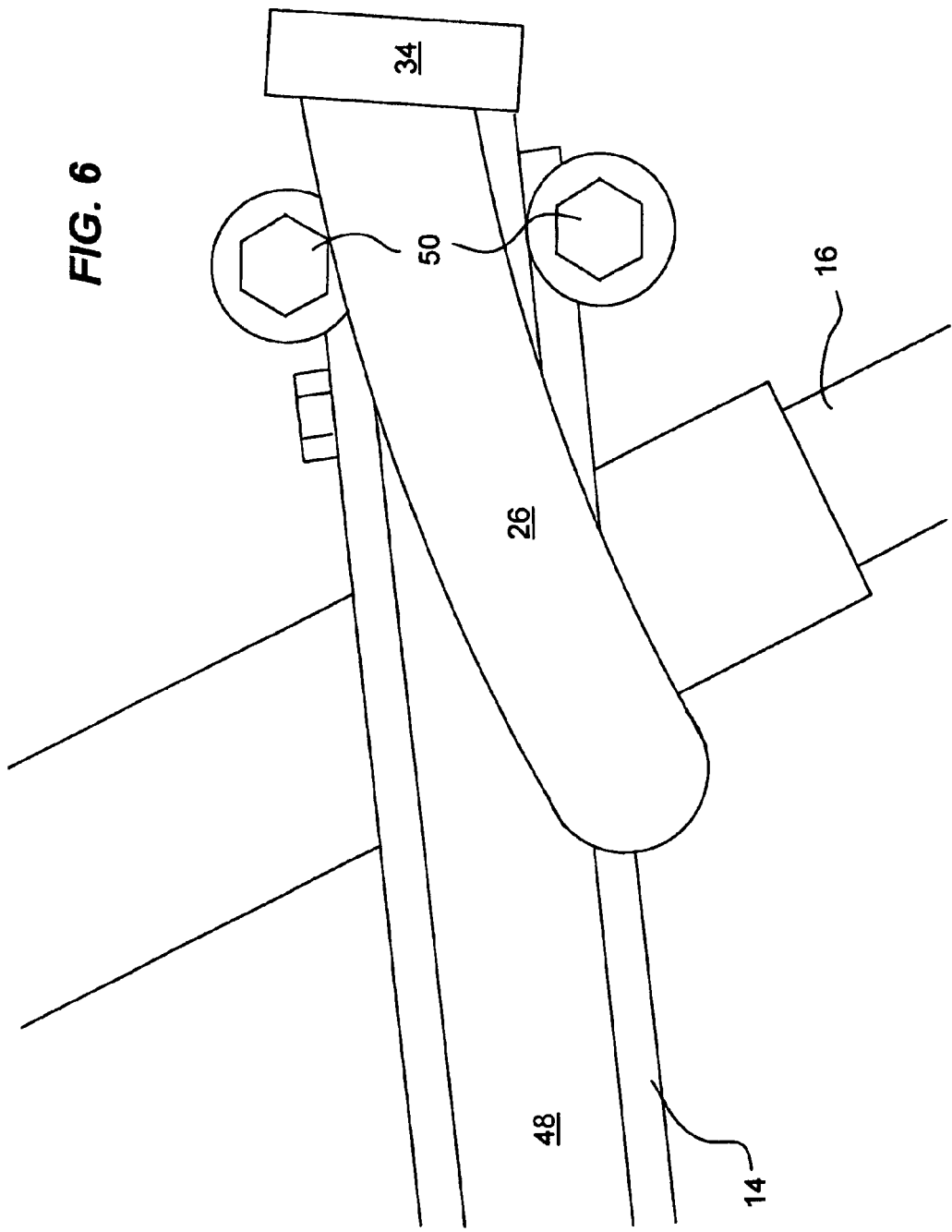

FIG. 6 Detail side view of an ankle rest.

Figure 7:
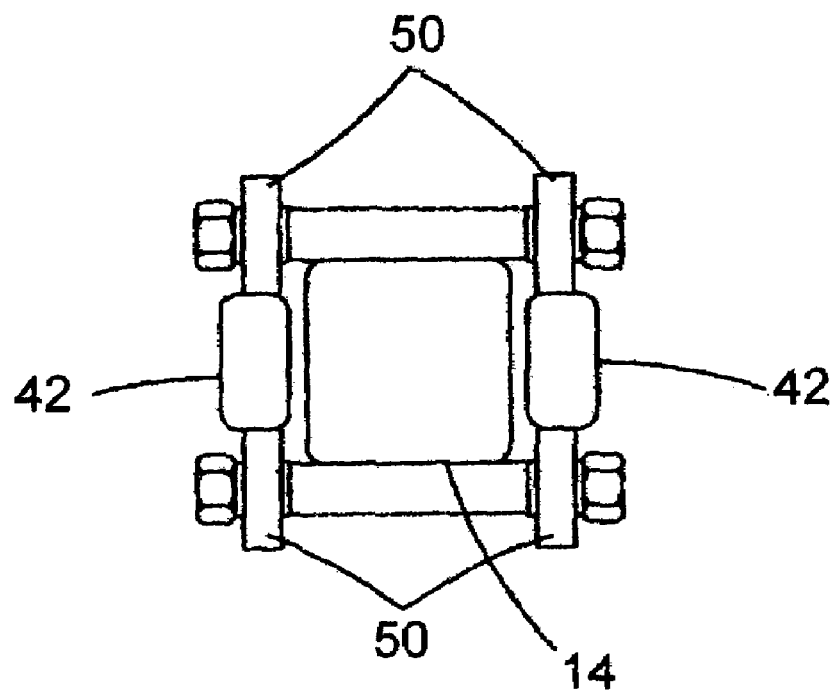

FIG. 7 Front view of frame and sliding frame.

Figure 8:
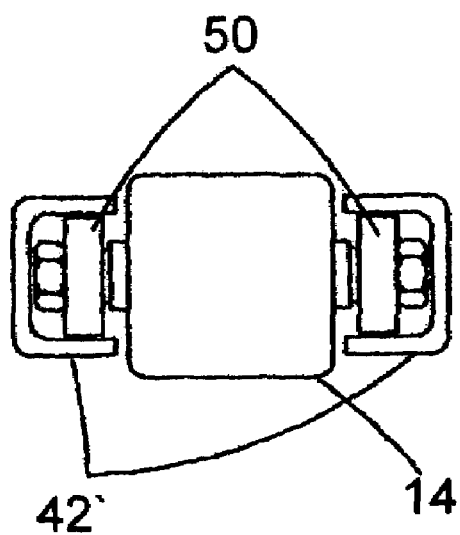

FIG. 8 Front view of alternate frame and sliding frame.

DETAILED DESCRIPTION OF THE PREFERRED EMBODIMENT

FIGS. 1–2 A recumbent bicycle (10) has a single stroke linear pedaling system (12) which, as will be explained later, is integral with a bicycle frame (14). The recumbent bicycle (10) has most of the standard components found on bicycles such as a fork (16), wheels (18), a seat (20), a derailleur system (22), and handlebars (24). A pair of ankle rests (26) act as pedals and offers a unique single stroke linear type of pedaling wherein both legs protract and retract simultaneously so that a single push is made instead of alternating pushes, as can be seen in FIGS. 3ab.

FIG. 4 The single stroke linear pedaling system (12) has a chain segment (44) partially wrapped around a one way sprocket wheel (46). One way sprocket wheels (46) are normally found on the rear axle of bicycles where they work like a ratchet, allowing a wheel (18) to freely rotate when no pedaling occurs and engage the wheel axle when pedaling occurs, of course, in this instant invention, there is indeed such a one way sprocket wheel (46) for the rear wheel (18) but the one we will be referring to is the one way sprocket wheel (46) that allows, in a first of two steps, for a forward pull of the upper part of the chain segment (44), as indicated by arrow (<<I>>, to not only rotate the one way sprocket wheel (46) but also to induce rotation of a main sprocket wheel (54) connected to it which acts like the standard forward sprocket wheel on a standard bicycle. Smaller sprocket wheels (20) can also be found adjacent the main sprocket wheel (54) as is usually the case in a standard multi-speed bicycle. From that point on, the working is identical to a standard bicycle having a standard derailleur system (or not). The second step involves the forward pull of the lower part of the chain segment (44) as indicated by arrow <<II>>, this motion turns the one way sprocket wheel (46) counterclockwise, which is when it does not induce rotation of the main sprocket wheel (54). This back and fro motion of the chain segment (44) is accomplished by way of the back and fro motion of a sliding frame (48) which is slidingly engaging the frame (14). A series of bearings (50) appropriately positioned on both the frame (14) and the sliding frame (48), horizontally and vertically; on top and underneath the frame (14) provide a smooth sliding motion while providing support for the sliding frame (48) onto the frame (14). A pair of stoppers (28) limit the extent of the sliding movement. This limit can be changed by changing the position of either one or both stoppers (28), moving both stoppers (28) forward while keeping the same relative spacing allows a long legged user to push the sliding frame (48) further forward. Shortening or lengthening the relative spacing between the two stoppers (28) allows for a shorter or longer stride of the sliding frame (48).

A variety of means can be used for changing the position of the stoppers (28), for the sake of illustrative purposes, FIG. 5 shows a series of holes (30) made into the frame (14) that allows for the repositioning of the stoppers (28) along the frame (14). It could also be conceived that a single slit along the length of the frame (14) would allow for continuous adjustment of the stoppers (28) but it could risk weakening the frame (14) structure. New discoveries in alloys or composite materials could eventually allow for that possibility though. Alternatively, instead of a slit, a rail made on the outside of the frame (14) could hold clamped-in stoppers (28). Suffice it to say that many means can be used to allow for the repositioning of the stoppers (28).

On FIGS. 5–6, the ankle rests (26) are fixedly attached at either ends of a transverse bar (34), which runs perpendicular and is contiguous with the sliding frame (48). The feet of a user will push onto the transverse bar (34) in order to push it forward and induce the linear pedaling action while the ankle rests (26) allow the user to bring the transverse bar (34) backward.

Back to FIG. 4, an important element of the workings is the chain extension (52) which extends beyond the chain segment (44) and around a pulley (32) to connect to a bracket (36) situated at the extremity of the sliding frame (48) and from which extends perpendicularly a stub (38) which links the sliding frame (48) to one end of the chain segment (44). Between the chain segment (44) and the chain extension (52) is an adjustment bracket (40) which adjusts the tension of the chain segment (44) which can be adjusted depending upon a user's preference. If the adjustment is too tight there is too much tension in the chain segment (44) and it can affect pedaling while too loose an adjustment makes the chain segment (44) skip sprockets off the one way sprocket wheel (46). The adjustment bracket (40) can also be positioned between the bracket (36) and the chain extension (52). In this configuration, the chain extension could in fact be an integral continuation of the chain segment (44) itself.

FIGS. 5, 7 and 8 The sliding frame (48) consists of two parallel bars (42) situated parallel and at either sides of the frame (14). The parallel bars (42) are held together at one end by the transverse bar (34) and at the opposite end by the bracket (36) which moves underneath the frame (14). Common usage has a tubular structure for the frame (14) whether the <<tube>> is round, oval, or any geometric shape including square such as in the figures. Other variations can be in the sliding frame (48) where the parallel bars (42) are shaped as <<C>> channels (42') which enclose the bearings (50).

The invention claimed is:

1. A recumbent bicycle with a single stroke linear pedaling system, consisting:
   a. a frame comprising a sprocket and a one way sprocket:
   b. a sliding frame in relation to said frame consisting:
      ankle rests acting as pedals wherein said ankle rests being fixedly attached at either ends of a transverse bar that running perpendicular to said frame; and
      a chain extension, said chain extension passing around a pulley rotationally attached to said frame and connecting to a bracket; and
      a chain segment including first and second ends and two parallel bars situated parallel and at either sides of said frame, wherein said first end of said chain segment connected at a first location and said second end of said chain segment connected at a second location on said sliding frame, said chain segment partially wrapping around a one way sprocket such that forward stroke of said sliding frame causes rotation of said one way sprocket wheel in a forward direction resulting in forward motion of said bicycle, and back stroke of said sliding frame causes rotation of said one way sprocket in a reverse direction.

2. A recumbent bicycle as in claim 1 wherein:
   said sliding frame slidingly connected to said frame by way of bearings;
   said bearings being situated at either sides of said frame, under said frame and on top of said frame;
   a pair of stoppers limit the extent of the sliding movement of said sliding frame;
   a means is provided for positioning said stoppers along said frame to vary the extent of the sliding motion;
   said means for positioning said stoppers being holes made into said frame.

3. A recumbent bicycle as in claim 2 wherein:
   said means for positioning said stoppers are selected from the group consisting of a slit made into said frame and a rail made on the outside of said frame.

4. A recumbent bicycle as in claim 1 wherein:
   an adjustment bracket adjusts the tension of said chain segment between said chain segment and said chain extension.

5. A recumbent bicycle as in claim 4 wherein:
   said adjustment bracket being set between said chain extension and said chain segment.

6. A recumbent bicycle as in claim 4 wherein:
   said adjustment bracket being set between said chain extension and said bracket.

7. A recumbent bicycle as in claim 1 wherein:
   said parallel bars are shaped as <<C>> channels enclosing said bearings.

8. A recumbent bicycle as in claim 1 wherein:
   said connecting means being a stub and bracket.

* * * * *